Feb. 4, 1930. O. E. APPLEGATE 1,745,826
COTTON PICKER
Filed Feb. 2, 1928 2 Sheets-Sheet 2
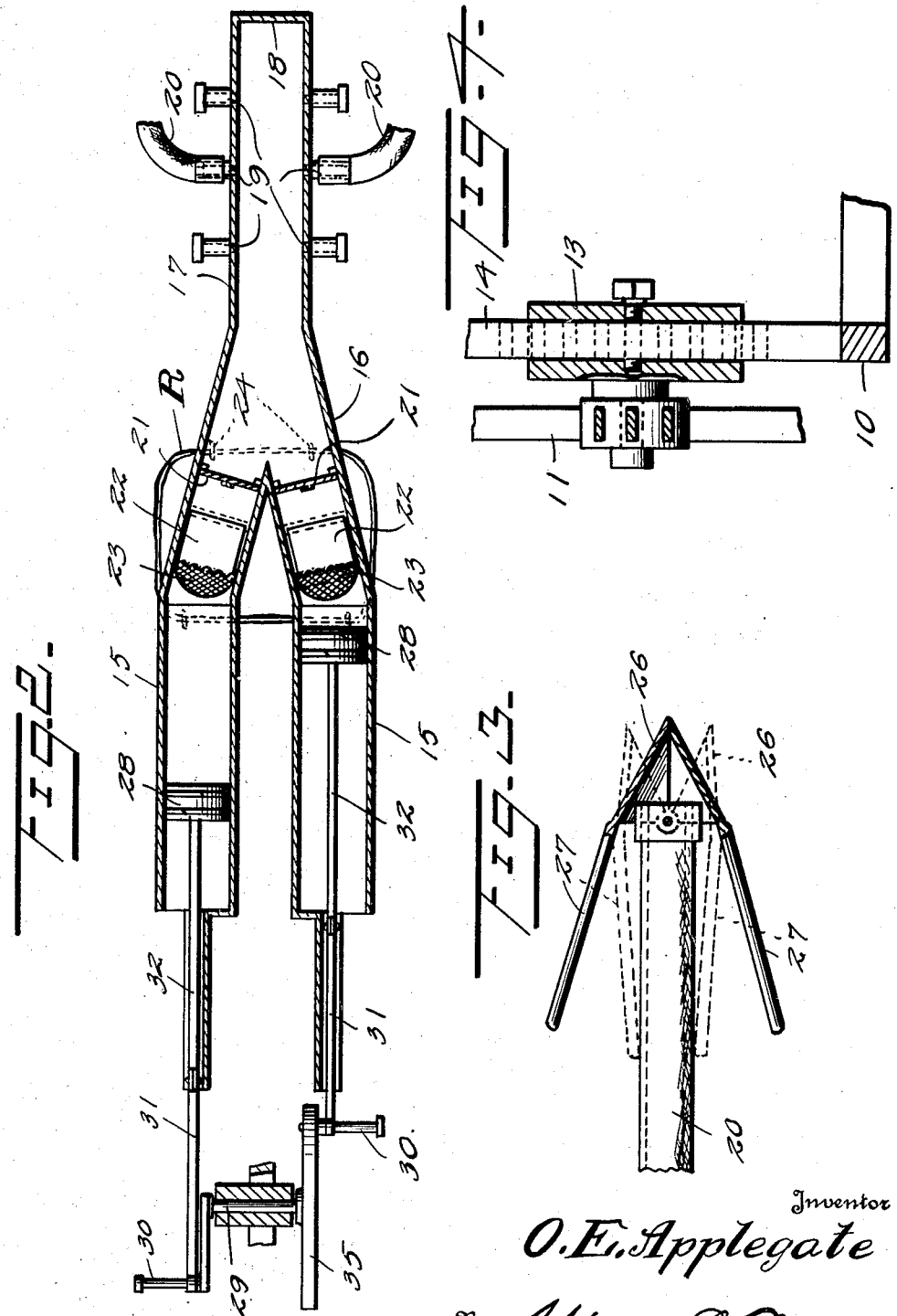

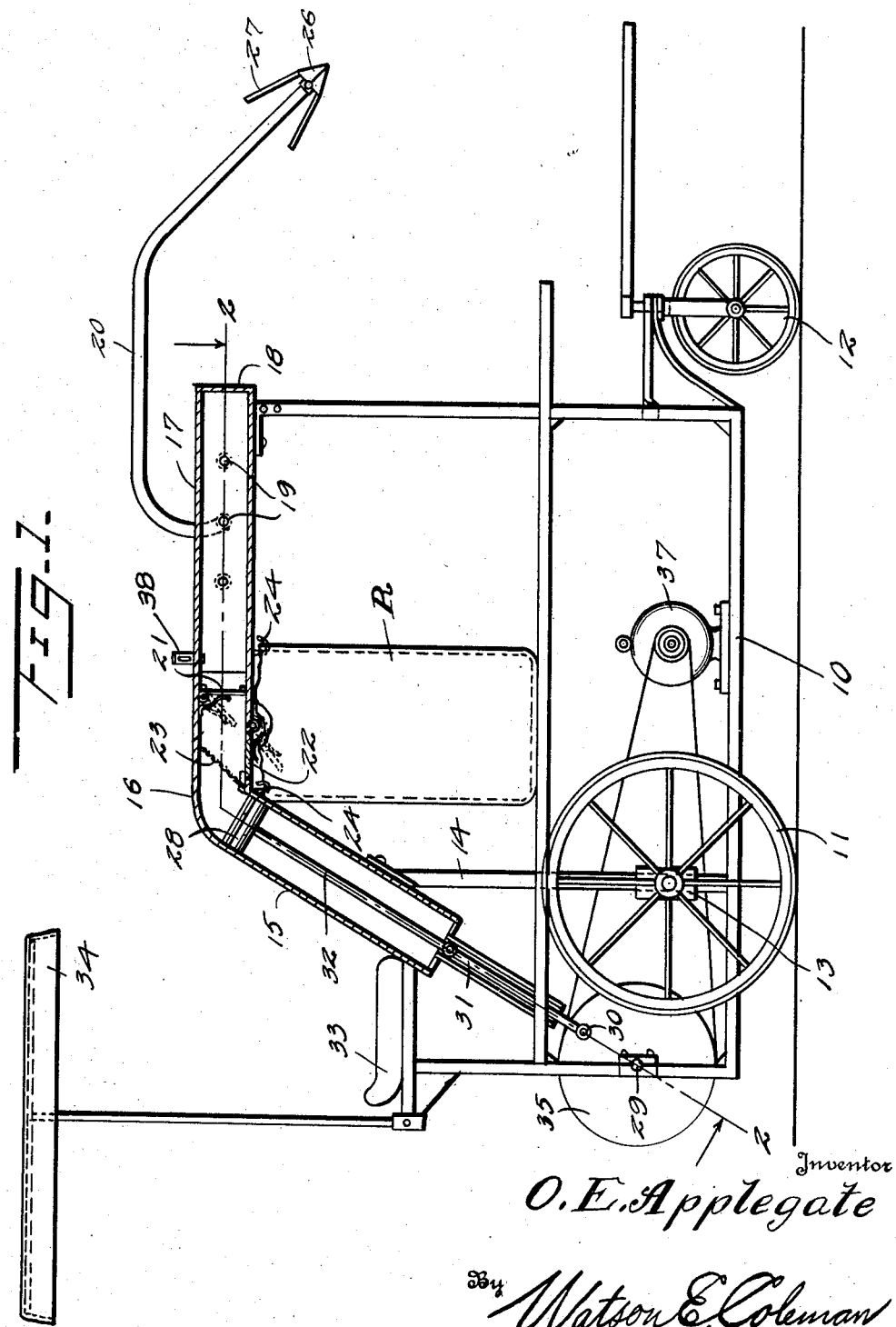

Patented Feb. 4, 1930

1,745,826

UNITED STATES PATENT OFFICE

OSCAR E. APPLEGATE, OF FAIRVIEW, NORTH CAROLINA

COTTON PICKER

Application filed February 2, 1928. Serial No. 251,395.

This invention relates to cotton pickers and has for an important object thereof the provision of a device of this character employing suction as a means for discharging cotton to receptacles and as a means for removing the cotton from the plant, additional means being provided which may assist in the removal in event the suction proves insufficient for this purpose.

A further object of the invention is to provide a device of this character which may be very readily and cheaply manufactured, which is simple in its construction and operation, which will be durable and efficient in service and a general improvement in the art.

These and other objects I attain by the construction shown in the accompanying drawings, wherein for the purpose of illustration is shown a preferred embodiment of my invention and wherein:—

Figure 1 is a side elevation partially in section of cotton picking apparatus constructed in accordance with my invention;

Figure 2 is a section through the apparatus showing a slightly modified form of operating mechanism and taken on the line approximately indicated by the line 2—2 of Figure 1;

Figure 3 is a detail sectional view through the nozzle end of the picking hose;

Figure 4 is a detail sectional view showing the manner of mounting the supporting wheels of the apparatus.

Referring now more particularly to the drawings, the numeral 10 generally designates a wheel supported frame which, in all instances, will embody wheels 11 which underlie the same and may, in some instances, embody a forward truck 12. The wheels 11 are preferably mounted for vertical adjustment with relation to the frame, as indicated at 13, to compensate for inclination of the ground upon which they are being employed. Supported from the frame by suitable standards 14 which form a portion of the frame is a pair of cylinders 15, which incline upwardly and forwardly and are arranged in parallel relation. The upper forward ends of these cylinders communicate, as at 16, with a forwardly extending horizontally disposed conduit 17, the forward end of which is closed, as indicated at 18. This conduit has longitudinally spaced inlets 19, each adapted for connection with a service or picking hose 20.

Within each connection 16 adjacent its front end is disposed a spring-closed check valve 21 opening toward the rear end of the conduit. Rearwardly of this check valve, the bottom wall of the connections 16 between the conduits and cylinders are provided with downwardly opening check valves 22. The connections 16 between the cylinders 15 and the conduit 17 have each arranged therein a screen 23 which preferably extends above the valves of the connections. Means are provided for supporting a sack beneath the opening provided when the valve 22 is opened, these means being at present disclosed as hooks 24 carried by the cylinder connections 16 and the conduit 17.

Each hose 20 has secured to the outer end thereof a nozzle, generally designated at 25. Each nozzle comprises a pair of valve forming jaws 26 having handles 27 which may be engaged by the operator to open the jaws. These jaws, when in the closed position, close the outer end of the hose, and when in the open position will admit the cotton boll. The jaws may also be closed upon the cotton in a boll and used as a tool to remove the same when stubborn.

Any suitable means may be provided for operating the pistons 28 of the cylinders 15. In Figure 2, I have illustrated a structure suitable for use on small machines. In this figure, a crank shaft 29 is disclosed, the cranks 30 of which provide mountings for pitman connections 31 with the piston rods 32. These cranks also act as pedals by means of which an operator occupying a seat 33 above the shaft may rotate the shaft. The operator's seat in this construction is preferably canopied, as indicated at 34.

The shaft is likewise further provided with a fly wheel 35, which may serve as a mounting for one of the cranks 30. In larger machines, this fly wheel may serve as a pulley for a drive belt 36 operated by a small gasoline motor or the like, generally designated at 37.

In the operation of the device, as each piston moves toward the lower end of its cylinder, suction is created in the connection 16 and conduit 17. This suction closes the valve 22 of the connection 16 and opens the valve 21 of the conduit 17, so that the suction is transmitted through the hoses 20 and so to the picking nozzles, drawing any cotton from these nozzles to the conduit 17 and into the connections 16 to this cylinder. As the movement of the piston is reversed, pressure is generated, forcing any cotton which may have collected against the screen 23 away from the screen, opening the valve 22 and closing the valve 21, with the result that the cotton is ejected from the connection 16 and passes into the receptacle R supported therebeneath. A relief valve 38 is preferably provided in the conduit 17 to prevent undue stress being placed thereon in event of simultaneous closure of all of the nozzle connections.

It will be obvious that a construction of this character is sufficiently simple to render the same extremely unlikely to fail in the field and to enable the same to be readily controlled. It will also be obvious that the construction hereinbefore set forth is capable of a certain range of change and modification without materially departing from the spirit of the invention and I accordingly do not limit myself to such specific structure except as hereinafter claimed.

I claim:—

In a cotton picker, a frame adapted to move over the ground, an overhead conduit supported above and in spaced relation to the frame, said conduit having an inlet for connection with a cotton picking hose, a pair of pump cylinders, a connection between one end of each pump cylinder and one end of the conduit, the opposite end of the conduit being closed, a check valve controlling communication between each of said connections and the conduit and opening into the connection, a screen in each connection, an opening formed in the bottom wall of each connection between the screen and check valve thereof, an outlet check valve controlling each opening, means for supporting a receptacle from the conduit beneath said openings, and means for reciprocating the pistons of the pump cylinders.

In testimony whereof I hereunto affix my signature.

OSCAR E. APPLEGATE.